United States Patent
Butler et al.

(10) Patent No.: US 10,016,735 B2
(45) Date of Patent: Jul. 10, 2018

(54) METHOD AND APPARATUS FOR ADDITION OF AN ALKALI METAL PROMOTER TO A DEHYDROGENATION CATALYST

(71) Applicant: FINA TECHNOLOGY, INC., Houston, TX (US)

(72) Inventors: James R. Butler, Spicewood, TX (US); Joseph E. Pelati, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 14/812,184

(22) Filed: Jul. 29, 2015

(65) Prior Publication Data
US 2015/0328609 A1     Nov. 19, 2015

Related U.S. Application Data

(63) Continuation of application No. 12/107,748, filed on Apr. 22, 2008, now Pat. No. 9,138,706.

(51) Int. Cl.
*B01J 4/00* (2006.01)
*F17D 1/06* (2006.01)
*B01J 23/78* (2006.01)

(52) U.S. Cl.
CPC ............... *B01J 4/001* (2013.01); *B01J 4/002* (2013.01); *F17D 1/06* (2013.01); *B01J 23/78* (2013.01); *B01J 2219/00024* (2013.01); *Y10T 29/4973* (2015.01); *Y10T 29/49718* (2015.01); *Y10T 137/4891* (2015.04)

(58) Field of Classification Search
CPC ........ B01J 4/00; F24F 13/0236; F24F 13/222; B05B 16/00
See application file for complete search history.

(56) References Cited

U.S. PATENT DOCUMENTS

| | | | | |
|---|---|---|---|---|
| 1,901,806 | A | * | 3/1933 | Fulton ...................... B05B 7/04 239/432 |
| 3,606,159 | A | * | 9/1971 | Sutton .................... B01D 47/06 239/127 |
| 4,162,971 | A | * | 7/1979 | Zlokarnik ............. B01F 3/0876 210/220 |
| 5,686,369 | A | * | 11/1997 | Chen ........................ B01J 23/04 502/25 |

* cited by examiner

*Primary Examiner* — Melvin C. Mayes
*Assistant Examiner* — Michael Forrest
(74) *Attorney, Agent, or Firm* — Albert Shung

(57) ABSTRACT

An apparatus and method for adding an alkali metal promoter into steam and contacting the solution with a dehydrogenation catalyst during a dehydrogenation reaction is disclosed. The apparatus has a first conduit capable of transporting an alkali metal salt solution and a second conduit in fluid communication with the first conduit, the second conduit capable of transporting steam so that the alkali metal salt is dissipated into the steam prior to entry into a dehydrogenation reaction zone.

18 Claims, 1 Drawing Sheet

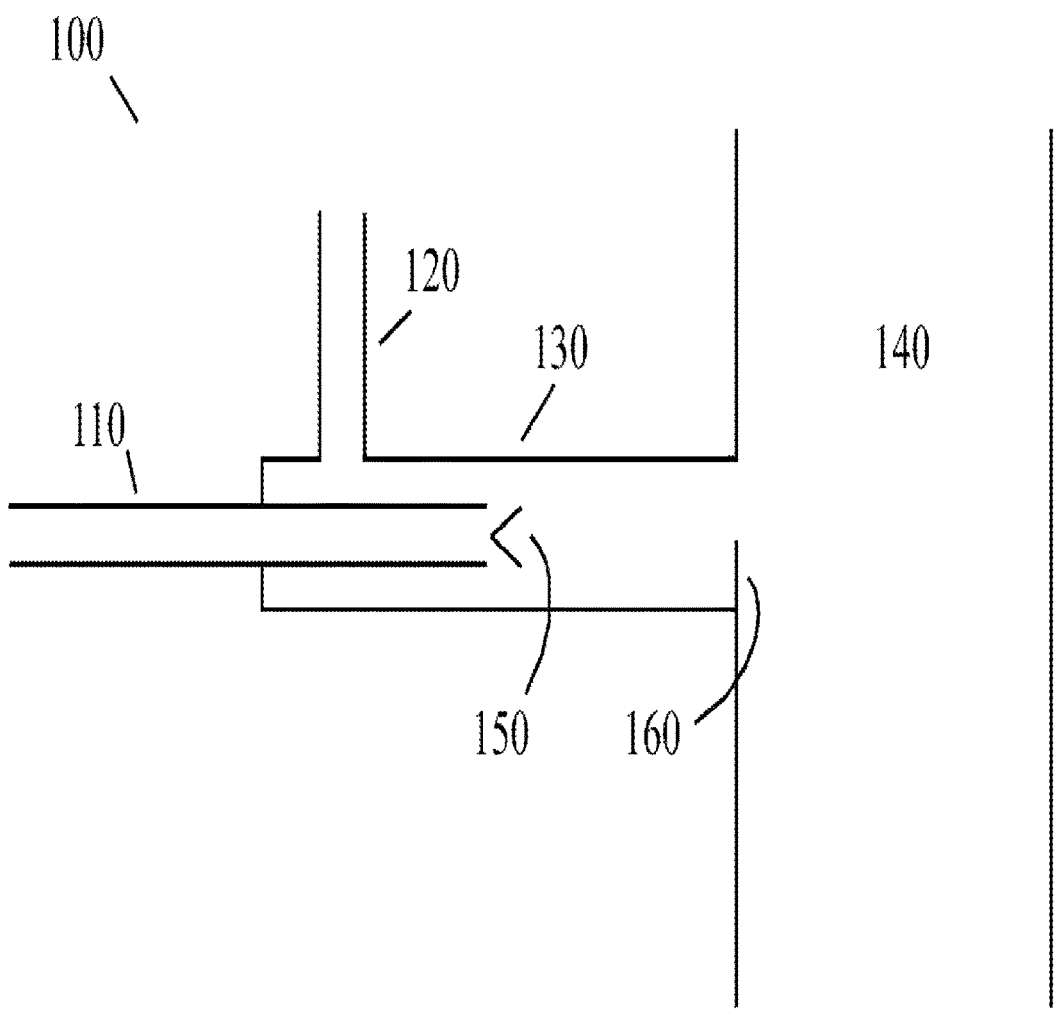

METHOD AND APPARATUS FOR ADDITION OF AN ALKALI METAL PROMOTER TO A DEHYDROGENATION CATALYST

CROSS-REFERENCE TO RELATED APPLICATIONS

This application is a Continuation of U.S. patent application Ser. No. 12/107,748, filed on Apr. 22, 2008, the entirety of which is incorporated herein by reference.

BACKGROUND OF THE INVENTION

Field of the Invention

This invention relates generally to catalytic dehydrogenation reactions, such as the dehydrogenation of alkyl aromatic compounds to produce vinyl aromatics, for example ethylbenzene into styrene.

Description of the Related Art

Alkenyl aromatics, such as vinyl aromatics, are important compounds used in the manufacture of many of today's products. These compounds are commonly produced by catalytic dehydrogenation reactions. For example, styrene can be produced by the catalytic dehydrogenation of ethylbenzene.

Processes for the catalytic dehydrogenation of compounds are well known in the art. An example is the dehydrogenation of an alkyl aromatic compound to yield a corresponding alkenyl aromatic compound. Another example is the dehydrogenation of a mono-olefin to yield a corresponding conjugated di-olefin. Many dehydrogenation catalysts and operating parameters are known, and each can have different advantages and disadvantages. The dehydrogenation catalysts customarily used in such processes are iron oxide based catalysts.

There are a number of factors to consider relative to dehydrogenation catalysts and their particular operation, such as for example between the level of conversion and the useful catalyst life. Catalyst life is an important consideration in dehydrogenation reactions. There are the costs related to the catalyst itself, such as the unit cost of the catalyst, the useful life of the catalyst, the ability to regenerate used catalyst, and the cost of disposing of used catalyst. There are also the costs related to shutting down a dehydrogenation reactor to replace the catalyst and/or to regenerate the catalyst bed, which includes labor, materials, and loss of productivity.

Normal catalyst deactivation can tend to reduce the level of conversion, the level of selectivity, or both, each of which can result in an undesirable loss of process efficiency. There can be various reasons for deactivation of dehydrogenation catalysts. These can include the plugging of catalyst surfaces, such as by coke or tars, which can be referred to as carbonization; the physical breakdown of the catalyst structure; and, the loss of promoters, such as the physical loss of an alkali metal compound from the catalyst. Depending upon the catalyst and the various operating parameters that are used, one or more of these mechanisms may apply.

It is generally preferred to maximize the useful catalyst life, and there are a number of techniques or methods that are known. One technique that is sometimes employed is to raise the reaction temperature. This can be accomplished, for example, by increasing the temperature of the reactant stream or by adding heat to the reactor chamber. Such a reaction temperature increase will generally increase the rate of reaction, which can offset the deactivation of the catalyst, but may also have undesirable results such as harming efficiency or selectivity. There can also be narrow limits to the utility of this temperature-raising technique. There may also be a mechanical temperature limit of the catalyst or the equipment, beyond which further temperature increases can degrade the catalyst's physical structure and/or the equipment's integrity. As this limit is approached, the catalyst would then need to be either replaced or regenerated by conventional ways. Conventional practice generally involves shutting down the reactor and physically removing the catalyst for replacement.

It would be desirable to have a catalyst regeneration method that could be used during steady-state process conditions without process interruption, which would maintain acceptable levels of conversion and selectivity. It is also desirable to have an apparatus to facilitate the addition of the catalyst life extender to the process during steady-state process conditions without process interruption.

SUMMARY

One embodiment of the present invention is an apparatus for vaporizing an alkali metal salt into steam having a first conduit capable of transporting an alkali metal salt solution, the first conduit having at least one opening through which the solution can exit the first conduit. A second conduit is in fluid communication with the first conduit, the second conduit capable of transporting a stream comprising steam, wherein as the alkali metal salt solution exits the first conduit it is dissipated into the steam forming a solution of alkali metal salt in steam.

In an aspect, the apparatus has at least one diffuser located adjacent to the opening of the first conduit to dissipate the alkali metal salt solution into the steam. The second conduit can be connected to a third conduit for transporting the vaporized alkali metal salt in steam into a stream within the third conduit. The stream located within the third conduit can also contain reactants for a dehydrogenation reaction of an alkyl aromatic hydrocarbon. The apparatus may further have a weir located adjacent to the connection to the third conduit to restrict the flow of any of the alkali metal that is not dissipated into the steam from entering the third conduit. The portion of the second conduit containing the opening of the first conduit can form a mixing chamber wherein the alkali metal stream can be dissipated into the steam to form a third stream prior to the third stream entering the third conduit. The portion of the first conduit can be disposed within the second conduit in a substantially concentric arrangement. The alkali metal salt can be added as a solid, liquid, or a vapor, or a combination thereof.

Another embodiment concerns a method of enhancing the activity of a dehydrogenation catalyst promoted with an alkali metal, during a catalytic dehydrogenation reaction. The method includes forming a first solution by adding an alkali metal salt to steam utilizing an apparatus for adding the alkali metal salt into the steam. The apparatus has a first conduit capable of transporting a first stream of the alkali metal salt, the first conduit having at least one opening through which the first stream can exit the first conduit. A second conduit is in fluid communication with the first conduit; wherein the second conduit is capable of transporting a second stream comprising steam. The first stream exits the first conduit and is dissipated into the second stream forming the first solution containing alkali metal salt of the first stream in solution with the steam of the second stream. The first solution is brought into contact with the dehydrogenation catalyst.

The alkali metal salt can be added in amounts sufficient to maintain substantially constant levels of catalyst activity, and in an aspect is a potassium salt compound. The catalytic dehydrogenation reaction can be the dehydrogenation of an alkyl aromatic hydrocarbon reactant stream to obtain an alkenyl aromatic hydrocarbon. The alkali metal salt can be added to the steam stream as a solid, liquid, or vapor, or a combination thereof. In an embodiment, the catalyst contains about 40-80 wt % iron oxide and about 5-30 wt % of an alkali metal compound. The alkali metal salt can be added in amounts equivalent to a continuous addition of about 0.01 to about 1000 parts per million by weight of alkali metal relative to the weight of the total reactant stream. In an embodiment, the alkyl aromatic hydrocarbon is ethylbenzene and the alkenyl aromatic hydrocarbon is styrene.

Yet another embodiment concerns a method of revamping an existing facility used for the dehydrogenation of ethylbenzene to make styrene utilizing a potassium promoted iron based catalyst. The method involves adding an apparatus to a steam input stream for vaporizing an alkali metal salt into the steam input stream. The apparatus has a first conduit capable of transporting an alkali metal salt, the first conduit having at least one opening through which the alkali metal salt can exit the first conduit. A second conduit is in fluid communication with the first conduit, wherein the second conduit capable of transporting a steam input stream. As the alkali metal salt exits the first conduit it is dissipated into the steam input stream forming a third stream containing vaporized alkali metal salt in solution with the steam. The portion of the first conduit containing the opening can be disposed within the second conduit in a substantially concentric arrangement. The apparatus may have at least one diffuser located adjacent to the opening of the first conduit to dissipate the first stream into the second stream. The second conduit of the apparatus may be connected to a third conduit for transporting the third stream into contact with a fourth stream within the third conduit and can further comprise a weir located adjacent to the connection of the second conduit to the third conduit to restrict the flow of any of the alkali metal that is not dissipated into the second stream from entering the third conduit.

Still another embodiment is an apparatus for supplying a potassium carboxylate catalyst life extender to a reaction chamber loaded with an iron oxide based, alkali metal promoted, dehydrogenation catalyst used to prepare a vinyl aromatic hydrocarbon from a feed stream including an alkyl aromatic hydrocarbon. The apparatus has a first conduit capable of transporting a first stream of a potassium carboxylate, the first conduit having at least one opening through which the first stream can exit the first conduit. At least a portion of the first conduit containing the at least one opening is disposed within a second conduit capable of transporting a second stream comprising steam. As the first stream exits the first conduit it is dissipated into the second stream forming a third stream containing vaporized potassium carboxylate of the first stream in solution with the steam of the second stream.

BRIEF DESCRIPTION OF THE DRAWINGS

FIG. 1 is an illustration of an embodiment of the apparatus of the present invention for vaporizing an alkali metal salt into steam.

DETAILED DESCRIPTION

Promoted iron oxide catalysts have been found to be especially useful in the dehydrogenation of alkyl aromatic hydrocarbons to alkenyl aromatic hydrocarbons. For example, the production of styrene by the dehydrogenation of ethylbenzene is commonly conducted by mixing ethylbenzene with steam, and passing the mixture through a dehydrogenation catalyst-packed bed. Typically, compounds of an alkali metal, such as potassium, will be present in the dehydrogenation catalyst. The potassium can tend to diminish the deposition of coke on the catalyst during the dehydrogenation, and thereby increase the useful life of the catalyst. In an aspect, the potassium may be present typically in a quantity of at least 0.01 mole per mole iron oxide up to 1 mole per mole iron oxide. One embodiment of a dehydrogenation catalyst contains from about 30 wt % to about 95 wt % iron oxide and about 1 wt % to about 30 wt % of potassium. Another embodiment of a dehydrogenation catalyst contains from about 40 wt % to about 80 wt % iron oxide and about 5 wt % to about 20 wt % potassium. Other components may also be added to the dehydrogenation catalyst to provide further promotion, activation, or stabilization characteristics.

The dehydrogenation of ethylbenzene is usually carried out in the presence of steam, with the weight ratio of steam:ethylbenzene being from about 0.5:1 to about 4:1, or alternatively from about 0.8:1 to about 2:1. The steam can serve as a heat transfer medium, and can also stabilize an intermediate oxidation stage of the catalyst and aid in the gasification of any organic deposits on the catalyst, thus countering carbonization of the catalyst. A portion of the organic deposits can be oxidized into carbon monoxide and/or carbon dioxide.

After a fresh load of catalyst or the regeneration of an existing catalyst, there is typically an initial period of high catalyst activity and selectivity followed by catalyst deactivation. There are a number of possible explanations for the gradual deterioration of catalyst activity and one or more mechanisms may apply in a particular process. One mechanism that may deactivate alkali metal promoted iron-based catalysts is alkali metal loss, wherein the alkali metal is physically released from the catalyst and becomes entrained with the reactant stream. Another mechanism that may deactivate alkali metal promoted iron-based catalysts is alkali metal site contamination, that is, the physical location of the alkali metal on the catalyst is covered or otherwise obstructed, such as by carbonization. As catalyst deactivation progresses, eventually the level of conversion or selectivity, or both, fall sufficiently low that the dehydrogenation process is no longer economically viable. At this point the process would typically have to be shut down and the catalyst either replaced or regenerated by conventional methods.

The present invention involves adding an amount of alkali metal compound to the process sufficient to regenerate, stabilize, or enhance the activity of the dehydrogenation catalyst and thereby maintain economical levels of conversion and selectivity and reduce or delay the need for catalyst replacement. The alkali metal compound is added to a steam input stream prior to it entering the process. The alkali metal compound can be added in a continuous or intermittent basis as needed and can be utilized in conjunction with other operational techniques such as raising the reaction temperature mentioned above. In one embodiment the alkali metal compound is a potassium compound. In one embodiment the alkali metal compound is a potassium salt compound that can go into solution with the steam. In alternate embodiments the alkali metal compound is a lithium compound, a sodium compound, a rubidium compound, a cesium compound, a francium compound, mixtures thereof, and salts thereof.

In one embodiment the alkali metal compound that is added is an organo potassium salt. A soluble organo potassium salt is put into solution with steam before being added to the dehydrogenation process. A potassium salt can be sprayed or otherwise distributed into a stream of steam, for example super heated steam, which can dissolve and/or vaporize the salt and create a steam solution containing the potassium that can then be added to the dehydrogenation process. Organo potassium salts can vaporize at lower temperatures than non-organo potassium compounds, thereby facilitating the distribution of potassium into the flow of steam that is added to the dehydrogenation process. Various ways of putting a salt compound into solution with a liquid or vapor stream are well known in the art, all of which are considered within the scope of this invention. Non-limiting examples of suitable organo potassium salts include potassium acetate, potassium benzoate, potassium citrate, potassium fumarate, potassium gluconate, potassium lactate, potassium maleate, potassium pamoate, potassium succinate, potassium tartrate, and mixtures thereof. Potassium salt compounds generally have excellent water solubility, due to the high hydration energy of the K+ ion.

The amount of alkali metal compound added is dependent upon various factors such as the amount and purity of the reactant stream, the quantity of catalyst charge, the run length of the catalyst load, the dehydrogenation operating conditions, and the particular catalyst being treated. The alkali metal compound can be added in an amount equivalent to a continuous addition of about 0.01 to about 1000 parts per million by weight of alkali metal relative to the weight of the total reactant stream. In alternate embodiments the alkali metal compound is added in an amount equivalent to a continuous addition of about 0.01 to about 750; about 0.10 to about 500; or about 0.1 to about 250 parts per million by weight of alkali metal relative to the weight of the total reactant stream. In some embodiments the alkali metal compound is added in an amount equivalent to a continuous addition of about 0.1 to about 100 parts per million by weight of alkali metal relative to the weight of the total reactant stream. U.S. Pat. No. 6,936,743 to Butler, which is incorporated herein by reference, discloses the addition of a catalyst life extender in amounts equivalent to a continuous addition of from about 0.01 to about 100 parts per million by weight of the total alkyl aromatic hydrocarbon directed into the reactor. The alkali metal compound can also be added in an intermittent manner, and intermittent addition may be desirable if the amount that is added is so small as to make continuous addition problematic. In some instances an intermittent addition of a larger quantity of alkali metal compound may provide superior results than a continuous addition of a smaller quantity. Variations of the manner in which the alkali metal compound are added are considered within the scope of this invention.

Referring now to FIG. 1, in one illustrative embodiment 100 an alkali metal salt is supplied via line 110 and is added to an input stream of steam via line 120 where they are combined in a mixing chamber 130 prior to the mixture being added to the dehydrogenation process/apparatus 140. The dehydrogenation process 140 shown herein can be an input stream to a dehydrogenation apparatus or can be a portion of the dehydrogenation apparatus, such as a dehydrogenation reaction zone. The alkali metal salt can be added as a liquid solution, as a solid, or in a vapor phase, or combinations thereof. In an aspect, the steam may be super heated. There may also be various mixing or agitating equipment employed within the mixing chamber 130 to facilitate the dissolution of the alkali metal salt into the steam. In an aspect, the mixing chamber 130 has a substantially concentric arrangement of the alkali metal salt line 110 within the steam line 120, with the streams from the salt line and the steam line contacting in a con-current flow pattern as shown in FIG. 1. In an alternative embodiment, the mixing chamber 130 has a concentric arrangement of the alkali metal salt line 110 within the steam line 120 with the streams from the salt line and the steam line contacting in a counter-current flow pattern, or with the alkali metal salt being sprayed or otherwise distributed within the mixing chamber 130. The alkali metal salt line 110 can alternately be attached at an any angle relative to the mixing chamber 130, such as from zero degrees on one embodiment having a con-current flow arrangement to 180 degrees on one embodiment having a counter-current arrangement, or alternatively on a 30 degree to 45 degree angle, or may be perpendicular to the mixing chamber 130 with the alkali metal salt being sprayed or otherwise distributed through an injector head. In the embodiment shown in FIG. 1, there is shown an optional diffuser 150 that can be used to dissipate the alkali metal salt within the steam stream in the mixing chamber 130. As used herein the term "diffuser" means any apparatus that acts to alter the flow path of the alkali metal salt to assist in its dissipation within the steam. The diffuser may decelerate the rate of flow, impart turbulence within the flow and/or impart a change in direction of the flow, or a combination thereof. The optional diffuser 150 may be of any shape to assist in dissipating the alkali metal salt within the steam stream. The diffuser may have an angled or conical shape, such as shown in FIG. 1, to deflect and distribute the alkali metal salt in a radial direction within the steam stream. There is also shown an optional weir 160 that can be used to restrict the flow of any alkali metal salt that is not in solution with the steam from entering the dehydrogenation process/apparatus 140. As used herein the term "weir" means any apparatus that restricts the flow of any alkali metal salt that is not in solution with the steam from entering the dehydrogenation process. The weir may inhibit the rate of flow of a portion of the flow that may contain alkali metal salt that is not fully in solution, such as in one embodiment the lower portion of the flow stream where heavier materials, such as alkali metal salt that is not in solution may settle. The mixture of alkali metal salt and steam can be added directly to a dehydrogenation reactor or to an input stream of the dehydrogenation process. Other ways of adding the alkali metal to the steam can include the heating and vaporizing of the alkali metal salt into the steam stream.

Dehydrogenation catalysts containing iron oxide and alkali metal compounds are well known in the art and are available commercially from various sources such as: BASF Corporation; Criterion Catalyst Company, L.P.; and Sud Chemie, Inc. These and similar catalysts are considered within the scope of this invention.

As used herein, the term "conversion" means in a quantitative sense the fraction, in % mole, of the reactant that is converted.

The term "selectivity" means the ability of the catalyst to selectively produce higher levels of a desirable product and lower levels of an undesirable product, for example to selectively dehydrogenate ethylbenzene to produce styrene instead of toluene or benzene.

The term "activity" means the ability of the catalyst to convert a certain percentage of the reactants for each pass of feedstock over the catalyst, for example to convert a certain percentage of the ethylbenzene to aromatics for each pass of feedstock over the catalyst.

The foregoing description of certain embodiments of the present invention has been presented for purposes of illustration and description. It is not intended to be exhaustive or limit the invention to the precise form disclosed, and other and further embodiments of the invention may be devised without departing from the basic scope thereof.

We claim:

1. An apparatus comprising:
a first conduit adapted to transport a first stream of an alkali metal salt, the first conduit comprising at least one opening through which the first stream can exit the first conduit;
a second conduit in fluid communication with the first conduit, wherein the second conduit is adapted to transport a second stream comprising steam, wherein a portion of the second conduit contains the at least one opening of the first conduit and is adapted for dissipation of the first stream into the second stream to form a third stream;
wherein the second conduit contains the at least one opening of the first conduit forming a mixing chamber, wherein a diffuser is located downstream of the at least one opening of the first conduit in the mixing chamber to dissipate the first stream into the second stream, wherein the first stream is vaporized concurrently into the second stream to form a first solution, wherein the portion of the first conduit containing the at least one opening is disposed within the second conduit in a substantially concentric arrangement; and
a weir adapted to restrict a flow of any of alkali metal salt that is not dissipated into the second stream, wherein the weir is located downstream from the at least one opening of the first conduit and upstream of a dehydrogenation reaction zone.

2. The apparatus of claim 1, wherein the diffuser is adapted to decelerate a rate of flow of the first stream.

3. The apparatus of claim 1, wherein the diffuser is adapted to impart turbulence within the flow of the first stream.

4. The apparatus of claim 1, wherein the diffuser is adapted to impart a change in a direction of the flow of the first stream.

5. The apparatus of claim 1, wherein the diffuser is adapted to deflect and distribute the alkali metal salt in a radial direction within the second stream.

6. The apparatus of claim 1, wherein the diffuser has an angled shape.

7. The apparatus of claim 1, wherein the diffuser has a conical shape.

8. The apparatus of claim 1, wherein the weir is downstream of the diffuser.

9. The apparatus of claim 1, wherein the diffuser is located adjacent to the at least one opening of the first conduit.

10. The apparatus of claim 1, wherein the portion of the second conduit that contains the at least one opening of the first conduit forms a mixing chamber.

11. The apparatus of claim 10, further comprising mixing or agitating equipment in the mixing chamber.

12. The apparatus of claim 10, wherein the first conduit is at an angle ranging from 0 to 180 degrees relative to the mixing chamber.

13. The apparatus of claim 12, wherein the angle ranges from 30 to 45 degrees.

14. The apparatus of claim 10, wherein the first conduit is perpendicular to the mixing chamber.

15. The apparatus of claim 1, wherein the second conduit is connected to a third conduit adapted to transport the third stream into a fourth stream within the third conduit.

16. The apparatus of claim 15, wherein the weir is located adjacent to the connection of the second conduit to the third conduit and is adapted to restrict the flow of any of the alkali metal that is not dissipated into the second stream from entering the third conduit.

17. A method of revamping an existing facility for the dehydrogenation of ethylbenzene to make styrene utilizing a potassium promoted iron based catalyst comprising:
adding an apparatus to a steam input stream for vaporizing an alkali metal salt into the steam input stream, wherein the apparatus comprises:
a first conduit adapted to transport a first stream of the alkali metal salt, the first conduit comprising at least one opening through which the first stream can exit the first conduit;
a second conduit in fluid communication with the first conduit, wherein the second conduit is adapted to transport a second stream comprising steam, wherein a portion of the second conduit contains the at least one opening of the first conduit and is adapted for dissipation of the first stream into the second stream to form a third stream, wherein the second conduit contains the at least one opening of the first conduit forming a mixing chamber, wherein a diffuser is located downstream of the at least one opening of the first conduit in the mixing chamber to dissipate the first stream into the second stream, wherein the first stream is vaporized concurrently into the second stream to form a first solution, wherein the portion of the first conduit containing the at least one opening is disposed within the second conduit in a substantially concentric arrangement; and
a weir adapted to restrict a flow of any of alkali metal salt that is not dissipated into the second stream, wherein the weir is located downstream from the at least one opening of the first conduit and upstream of a dehydrogenation reaction zone.

18. An apparatus for supplying a potassium carboxylate catalyst life extender to a reaction chamber loaded with an iron oxide based, alkali metal promoted, dehydrogenation catalyst used to prepare a vinyl aromatic hydrocarbon from a feed stream including an alkyl aromatic hydrocarbon, the apparatus comprising:
a first conduit adapted to transport a first stream of a potassium carboxylate, the first conduit having at least one opening through which the first stream can exit the first conduit;
a second conduit, wherein at least a portion of the first conduit containing the at least one opening is disposed within the second conduit, wherein the second conduit is adapted to transport a second stream comprising steam, wherein the apparatus is adapted to dissipated the first stream into the second stream as the first stream exits the first conduit, forming a third stream containing vaporized potassium carboxylate in solution with steam, wherein the second conduit contains the at least one opening of the first conduit forming a mixing chamber, wherein a diffuser is located downstream of the at least one opening of the first conduit in the mixing chamber to dissipate the first stream into the second stream, wherein the first stream is vaporized concurrently into the second stream to form a first solution, wherein the portion of the first conduit containing the at least one opening is disposed within the second conduit in a substantially concentric arrangement; and a weir adapted to restrict a flow of any of potassium carboxylate that is not dissipated into the steam, wherein the weir is located downstream from the at least one opening of the first conduit and upstream of the reaction chamber.

\* \* \* \* \*